United States Patent [19]
Ghotbi

[11] Patent Number: 5,233,509
[45] Date of Patent: Aug. 3, 1993

[54] SWITCH-MODE AC-TO-DC CONVERTER

[75] Inventor: Reza Ghotbi, Tucson, Ariz.

[73] Assignee: International Business Machines Corporation, Armonk, N.Y.

[21] Appl. No.: 863,621

[22] Filed: Apr. 3, 1992

[51] Int. Cl.$^5$ .......................... H02M 7/12; G05F 1/56
[52] U.S. Cl. ......................................... 363/89; 363/80; 323/222
[58] Field of Search ........................ 363/79, 80, 81, 82, 363/84, 89; 323/222, 285, 207

[56] References Cited

U.S. PATENT DOCUMENTS

| | | | |
|---|---|---|---|
| 4,193,111 | 3/1980 | Wester | 363/84 |
| 4,677,366 | 6/1987 | Wilkinson et al. | 323/222 |
| 4,730,242 | 3/1988 | Divan | 363/37 |
| 4,864,483 | 9/1989 | Divan | 363/37 |
| 4,940,929 | 7/1990 | Williams | 323/222 |
| 4,943,902 | 7/1990 | Severinsky | 363/80 |
| 4,964,029 | 10/1990 | Severinsky | 363/80 |
| 5,003,454 | 3/1991 | Bruning | 363/81 |
| 5,006,975 | 4/1991 | Neufeld | 363/80 |
| 5,019,952 | 5/1991 | Smolenski et al. | 363/16 |

OTHER PUBLICATIONS

IBM TDB, "High Power Factor AC-DC Converter", vol. 33, No. 8, Jan. 1991, G. A. Ohnstad, pp. 113–115.
IBM TDB, "Power Supply Designed for Power Factor Correction and Availability", vol. 32, No. 9A, Feb. 1990, J. E. Kress and V. S. Moore, pp. 383–385.
R. Itoh, K. Ishizaka, "Single Phase sinusoidal convertor using Mosfets" IEEE Proceedings, vol. 136, Pt. B, No. 5, Sep. 1989, pp. 237–241.
R. Wu, S. Dewan, and G. Selmon, "A PWM AC-to-DC Converter with Fixed Switching Frequency", IEEE Transactions on Industry Applications, vol. 26, No. 5, Sep./Oct. 1990, pp. 880–883.

Primary Examiner—Steven L. Stephan
Assistant Examiner—Adolf Berhane
Attorney, Agent, or Firm—C. B. Lobsenz; F. E. Anderson

[57] ABSTRACT

An adjustable near unity power factor is achieved while reducing harmonics in a switch-mode power supply by replacing the conventional diode bridge in the front end with an H-bridge driver. Two feedback loops are required, one feedback loop is used to regulate a DC bulk voltage by comparing the DC bulk voltage to a reference voltage and generating an error signal therefrom. A programmable offset is applied to the error signal for adjusting the power factor. A second feedback loop samples and scales the AC input voltage for use as a scaled replica of the input current. The actual input current is then compared to the scaled replica current to produce a second error signal. The two error signals are multiplied to determine the desired input current wherein the desired input current follows the AC input voltage. The desired input current is pulse width modulated by a fixed frequency sawtooth waveform for providing switching signals for controlling the H-bridge driver. The H-bridge driver thus operates such that the input current closely follows the AC input voltage and near unity power factor is maintained. A DC-to-DC converter follows the H-Bridge driver using a single feedback loop for regulating a desired DC output voltage.

18 Claims, 4 Drawing Sheets

SWITCH-MODE AC-TO-DC CONVERTER

FIELD OF THE INVENTION

This invention relates generally to the field of power supplies and more particularly, to a switch-mode AC-to-DC converter using a switching device for providing rectification while maintaining a near unity power factor.

BACKGROUND OF THE INVENTION

Most electronic equipment having substantial power requirements must draw power from an AC line source. An AC voltage drawn therefrom, however, is generally not useable by the electronic equipment. The AC voltage is therefore converted to a DC voltage by an AC-to-DC converter. Furthermore, most electronic equipment requires either a different DC voltage magnitude other than an associated converted DC voltage magnitude and/or several different DC voltage magnitudes. The different DC voltage magnitudes are subsequently provided by a DC-to-DC converter coupled to an output of the AC-to-DC converter.

Conventional switch-mode power supplies use a diode bridge as a front-end AC-to-DC converter for rectifying the AC voltage. The rectified AC voltage typically contains an unacceptable amount of ripple. This ripple voltage is substantially removed by a large filter capacitor following the diode bridge to provide a DC voltage known as the DC bulk voltage. FIG. 1a depicts a conventional switch-mode power supply having a diode bridge 2 and a filter capacitor 3 for providing the DC bulk voltage. The DC bulk voltage is then provided to a DC-to-DC converter 4 which produces an output voltage at the desired level. Typical DC-to-DC converters rely upon the storage characteristics of capacitors and inductors while alternately switching the applied DC voltage. The result is a squarewave waveform that is rectified by power Schottky diodes and filtered by a capacitor. An improved DC-to-DC converter is described by Andresen in a commonly assigned patent application Ser. No. 07/863,620, filed on an even date herewith.

Several problems exist in conventional switch-mode power supplies. Bridge diodes due to inherent forward voltages cause unwanted power dissipation thereby adversely affecting a conversion efficiency of the power supplies. Furthermore since an input current only conducts during a portion of any cycle, undesirable harmonic distortion occurs (Fourier harmonics). A typical input current waveform 6 is shown in FIG. 1b. As a result of a non-sinusoidal current which has to be provided by a utility source, a power factor is reduced (the ratio of the average power to the magnitude of the complex power), and still more harmonics currents are generated. The result is inefficient use of the input power, transformer and circuit breaker stress and excessive neutral conductor currents in wye-delta four-conductor three-phase circuits.

These problems can be better understood by analyzing a building's electrical distribution system. The power distribution system for a building generally includes a three-phase power input from high voltage lines to a step-down transformer. The step-down transformer's primary is usually connected in a delta configuration which eliminates the need for a fourth neutral conductor and the secondary, connected in the wye configuration (having a common neutral conductor), usually provides 120 volts RMS phase to-neutral (U.S.). Not uncommonly, the loads connected to the three phases of the secondary include appliances, computers, lighting air-conditioning, etc. Equipment using typical switch-mode power supplies present nonlinear loads to the secondary which results in power losses, noise and harmonics, and overstressing.

The diode bridge 2 and filter capacitor 3, as depicted in FIG. 1a present a nonlinear load. The non-sinusoidal current 6, as shown in FIG. 1b, creates still further problems in three phase power systems. Ideally the neutral conductor should carry zero current, hence neutral conductors are generally much smaller in diameter than phase conductors. The third harmonics of the non-sinusoidal currents, which usually dominate, are additive. Therefore, a building wired for mainly linear loads, but housing many nonlinear loads, is probably overloading the neutral conductor. The result is a fire hazard.

The input current and power factor of a power supply can be corrected, to some degree, by passive filters. Unfortunately, passive components making up the passive filters produce power dissipation and electromagnetic interface (EMI). The passive components are generally large and expensive, thereby limiting passive power factor correction to utilities or large users and suppliers of electric power. Additionally the drawbacks of passive power factor correction make this solution unsuitable for most electronic equipment.

A more suitable solution for correcting the power factor in electronic equipment involves active circuits and converters. Flyback and boost converter control circuits, for example, are available in integrated circuit form and are capable of providing performance above 0.90 power factor while reducing total harmonic distortion (THD) to below about 5 percent. Boost converters, currently the most popular technique, produce output voltages having greater magnitudes than the input voltages (for example, 120 vac input and 380 vdc output). Boost converters can currently operate effectively up to about 1000 watts. Flyback converters are typically limited to power requirements below about 100 watts. Alternatively, a bulkless converter is able to provide performance above 0.90 power factor though THD is substantially higher than in the other mentioned converters.

Several switch-mode power supplies have been taught using diode bridge front ends followed by boost converters. For example. Smolenski, et al. in U.S. Pat. No. 5,019,952, Bruning in U.S. Pat. No. 5,003,454, Neufeld in U.S. Pat. No. 5,006,975, Williams in U.S. Pat. No. 4,940,929, and Wilkinson et al. in U.S. Pat. No. 4,677,366 each teach correcting the power factor by shunting a boost current following a diode bridge. Each of these teachings, however are limited to about 1,000 watts.

A somewhat different approach is taught by Wester in U.S. Pat. No. 4,193,111. Wester teaches connecting two transistor switching pairs in parallel with a diode bridge for shaping the input current so as to follow the input voltage by selectively switching the transistor switching pairs.

Still a different approach is taught by Severinsky in U.S. Pat. Nos. 4,943,902 and 4,964,029. Severinsky teaches the use of a diode bridge in the front end followed by a buck converter. This scheme, unlike those above requires that the voltage following the buck converter be less than its input voltage.

In U.S. Pat. Nos. 4,730,242 and 4,864,483, Divan teaches a DC-to-AC converter that relies upon resonating waveforms in a power converter for switching power transistors to reduce switching losses.

A circuit for improving the power factor to about 0.9 by increasing the conduction angle of the diodes making up a diode bridge by alternately switching two power transistors is set forth in IBM TDB vol. 32 No. 9A.

An AC-to-DC converter using a flyback converter is taught in IBM TDB Vol. 33. No. 8. Although the cited prior teachings improve or correct the power factor to a substantial degree, they all fall short of providing a switch-mode power supply capable of operating with a near unity power factor.

A proposed international standard by the International Electro-technical Commission (IEC) would require strict standards for harmonic currents generated by the front-end of electronic equipment connected to an AC utility. The electronic equipment's power factor is directly related to the level of harmonics in the input current. The standard, IEC 555-2, dictates absolute limits for harmonic currents that any electronic equipment can demand from (or inject into) the AC utility. According to the proposed standard, the input current of such electronic equipment must be nearly sinusoidal and in phase with the AC utility. The actual standards proposed by IEC 555-2 allow for decreased power factors for correspondingly decreased power requirements of the electronic equipment. If the proposed standard is passed, any electronic equipment shipped to the European Community, and world trade, will have to meet this standard.

Thus, what is needed is a switch-mode power supply that is capable of operating near the theoretical power factor limit of unity such that minimal harmonics are injected into or demanded from the AC utility as required by the proposed IEC 555-2 standard, and allowing an adjustment of the power factor and total harmonic distortion for various load power levels.

SUMMARY OF THE INVENTION

Accordingly, it is an object of the present invention to provide an improved switch-mode power supply.

Another object of the present invention is to provide a switch-mode AC-to-DC converter using an H-bridge to convert an AC input voltage to a DC bulk voltage.

Yet another object of the present invention is to provide a switch-mode AC-to-DC converter which maintains a near unity power factor.

Still another object of the present invention is to provide a switch-mode AC-to-DC converter that introduces only minimal harmonics into an AC line source.

Still another object of the present invention is to provide a switch mode AC-to-DC converter having an adjustable power factor for balancing load power levels and voltage regulation requirements.

These and other objects of this invention are accomplished by a switch-mode power supply coupled to a utility source for receiving an AC input voltage and drawing an input current therefrom. Negative feedback is used to reduce harmonics injected into the utility source and to ensure an adjustable power factor that can be made substantially equal to unity. The switch-mode power supply includes an inductor coupled to the utility source for shaping the input current. An H-bridge driver having first and second switching pairs is coupled to the inductor for receiving the AC input voltage and the input current. The switching pairs can be realized using power MOSFETs. The switching pairs are alternately switched on and off according to the phase relationship of the input current and the AC input voltage for generating a DC bulk voltage therefrom while maintaining the input current in phase with the AC input voltage.

The H-bridge driver is further coupled to a controller circuit for receiving a plurality of switching signals wherein the plurality of switching signals control the first and second switching pairs. A first control path is formed by an input current regulator circuit coupled for receiving the AC input voltage and the input current. The input current regulator circuit scales the AC input voltage into a reference current signal, the reference current signal representing a desired input current for achieving a near unity power factor. The reference current signal is then compared to the input current and a first error signal is generated from a difference therebetween.

A second control path is formed by a DC bulk regulator circuit that is coupled for receiving the DC bulk voltage and a first reference voltage. A second error signal is generated therefrom for regulating the DC bulk voltage. The second error signal is further offset by a constant, K, for adjusting the effect of the second error signal. The controller circuit is coupled to the input current regulator and the DC bulk regulator circuit for generating the plurality of switching signals by multiplying the first error signal and the offset second error signal. The controller circuit receives a fixed frequency signal for pulse width modulating the plurality of switching signals.

A DC-to-DC converter follows the H-bridge driver for converting the DC bulk voltage to a DC bus voltage having a predetermined magnitude. The DC-to-DC converter includes a half bridge driver means coupled for receiving and chopping the DC bulk voltage. An isolation transformer receives the chopped DC bulk voltage and supplies an isolated chopped signal to a rectification circuit and filter which provides the DC bus voltage having the predetermined magnitude. A DC bus regulator circuit receives both the DC bus voltage and a second reference signal for generating a third error signal as a function of the difference between the DC bus voltage and the second reference signal. A half-bridge controller is coupled for receiving the third error signal and a fixed frequency signal for pulse width modulating the third error signal for generating a half-bridge switching signal for controlling switching of the half-bridge driver.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 2:
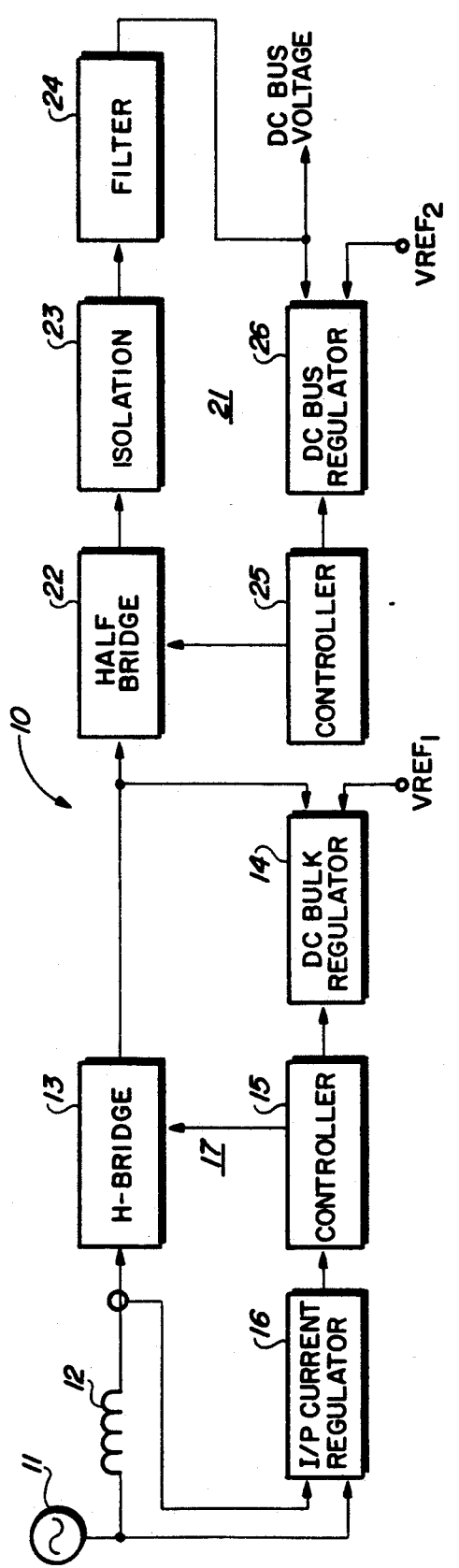
FIG. 2 is a block diagram of a switch-mode power supply according to the preferred embodiment of the present invention.

Referring now to FIG. 2, a switch-mode power supply 10 is shown which includes a switch-mode AC-to-DC converter 17 followed by a DC-to-DC converter 21. The switch-mode AC-to-DC converter 17 will convert, for example, an AC input voltage of 120 volts RMS into a DC bulk voltage having a magnitude of 200 volts. The DC-to-DC converter 21 thereafter reduces the DC bulk voltage to a DC bus voltage having a desired magnitude, for example, 36 volts. In the switch-mode power supply 10, a front end thereof uses an H-bridge 13 in place of a diode bridge that is used in conventional switch-mode power supplies. By using, and properly controlling, the H-bridge 13, non-sinusoidal currents associated with charging a DC bulk capacitor can be nearly eliminated. Hence a power factor, adjusted to near unity, can be presented to a power utility.

The switch-mode AC-to-DC converter 17 receives an AC input voltage from a supply 11 through an inductor 12. The supply 11 could be, for example, one phase of a transformer's secondary winding. An electro-magnetic interference (EMI) filter, though not shown, is implicit. A controller 15 has an output connected to the H-bridge 13 for the purpose of accomplishing two somewhat competing goals, one goal is to regulate the DC bulk voltage; and the other goal is to force an input current to the switch-mode power supply 10 to closely follow the AC input voltage. The DC bulk voltage must be regulated to ensure a magnitude that could destroy the switch-mode power supply 10 is not reached, and the input current must be controlled to maintain the near unity power factor. Improving the power factor adversely affects voltage regulation and vice-versa. The relative importance of the DC bulk voltage regulation and the power factor can be balanced by the controller 15.

An input of a DC bulk regulator 14 is connected to an output of the H-bridge 13 for receiving the DC bulk voltage therefrom. Also connected to an input of the DC bulk regulator 14 is a reference voltage. $VREF_1$. $VREF_1$, is a constant voltage having a magnitude much lower than the DC bulk voltage magnitude and is provided by a voltage reference generator (not shown) as is well known in the art. The DC bulk regulator 14 compares $VREF_1$ to the DC bulk voltage (the DC bulk voltage is scaled), and generates a DC bulk error signal. An offset is added to the DC bulk error signal for balancing the degree of voltage regulation provided versus the power factor level achieved. An output of the DC bulk regulator 14 is connected to one input of the controller 15 thus providing negative feedback to the H-bridge 13.

An input current regulator 16 has one input connected for receiving the AC input voltage and a second input connected for receiving an inductor current, $I_{12}$, from the inductor 12. The AC input voltage is scaled and multiplied by the DC bulk error signal provided at the output of the DC bulk regulator 14 to produce a reference current signal which is representative of a desired input current for achieving a desired power factor. The reference current signal is then compared to $I_{12}$. An output of the input current regulator 16 is connected to another input of the controller 15 and provides a scaled, in-phase replica of the AC supply voltage thereto.

Figure 3:
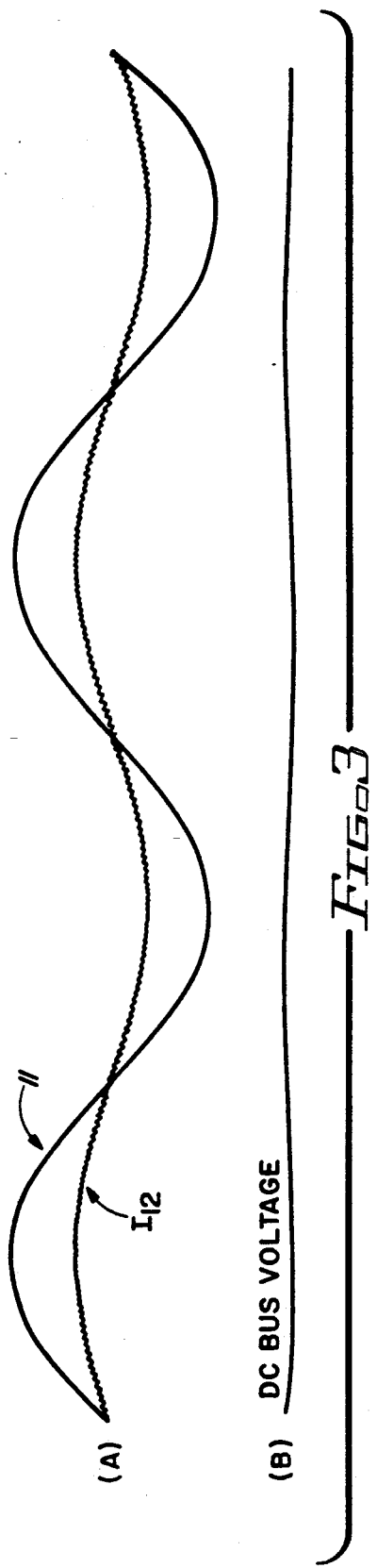
FIGS. 3a and 3b are waveform diagrams showing the input voltage and input current, and a DC bulk voltage according to the preferred embodiment of the present invention.

The controller 15, as connected to the H-bridge 13, provides switching signals thereto for alternately opening and closing two switching pairs of the H-bridge 13 such that the direction of power transfer is from the supply 11 to a load (the DC-to-DC converter 21). A magnitude of the power transferred is controllable by varying a gain of the input current regulator 16. Using negative feedback allows the switch-mode AC-to-DC converter 10 to cause the input current to follow the AC input voltage closely with little harmonics. The relative importance of regulating the DC bulk voltage as opposed to regulating a sinusoidal input current can be adjusted in the controller 15. Simulation results as shown in FIG. 3, confirm that the DC bulk voltage is regulated while the input current closely follows the AC input voltage.

Figure 1A:
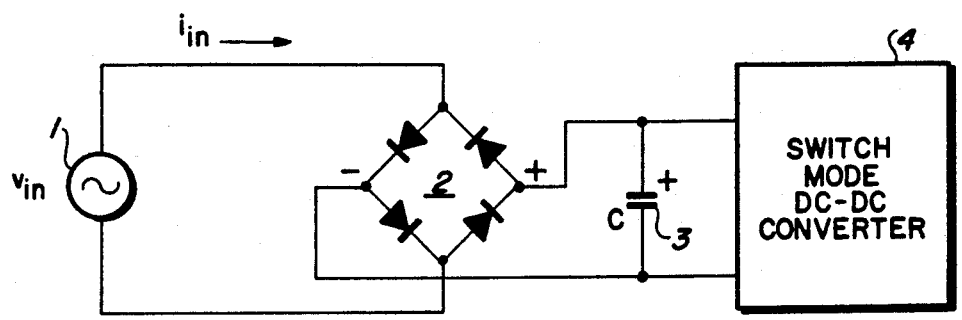
FIG. 1a is a circuit diagram of a prior art switch-mode power supply using a diode bridge for rectification.
Figure 1B:
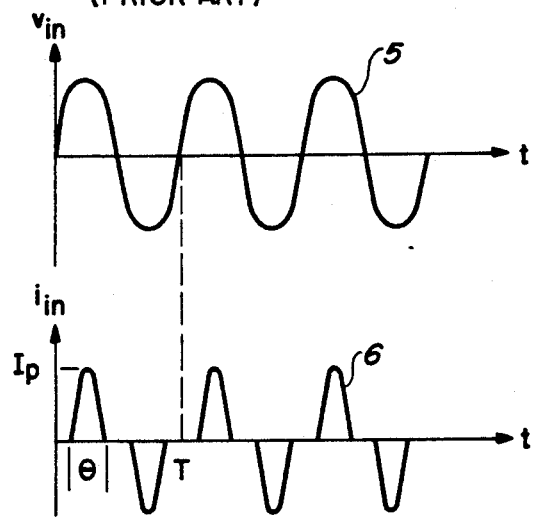
FIG. 1b is a waveform diagram showing the input voltage and input current to the circuit of FIG. 1A.
Figure 4:
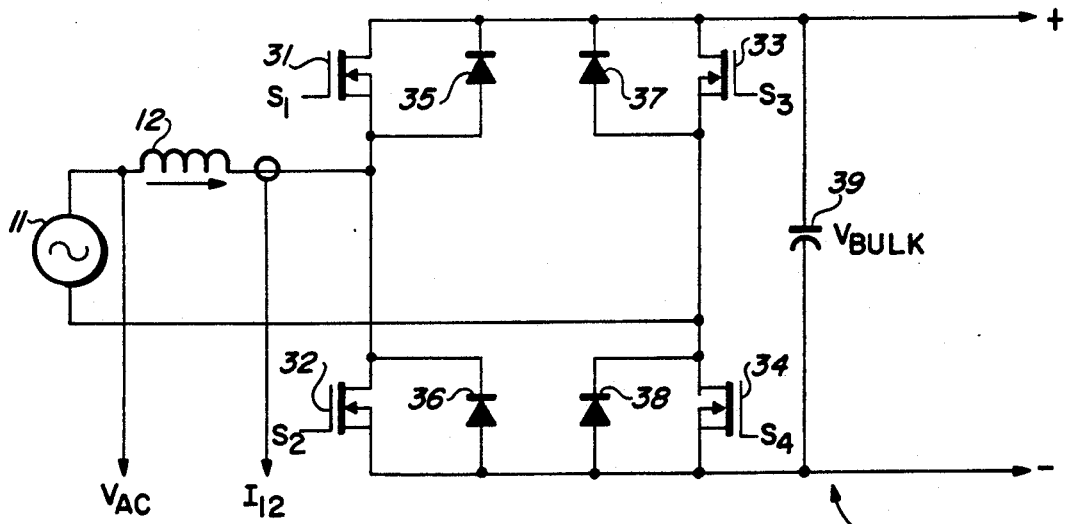
FIG. 4 is a circuit diagram depicting the front end of the switch-mode power supply of FIG. 2.

Referring now to FIG. 4, the front end of the switch-mode power supply 10 is shown in schematic form. The inductor 12 is coupled between the supply 11 and the H-bridge 13 wherein the AC input voltage, $V_{AC}$, and the input current, $I_{12}$, are tapped from first and second ends of the inductor 12, respectively. $V_{AC}$ and $I_{12}$ are supplied to the input current regulator 16. The inductor 12 regulates or shapes the input current to the H-bridge 13 for keeping the inductor current in-phase with $V_{AC}$. In conventional switch-mode power supplies, an inductor is provided at the input for providing EMI filtering. In the preferred embodiment of the present invention, however, the EMI filter is assumed and not shown.

Power MOSFETs (metal oxide semiconductor field effect transistors) 31–34 are connected in an H-bridge configuration to form the two switching pairs making up the H-bridge 13 with the respective parasitic body diodes 35–38 shown for completeness. The power MOSFETs 31 and 34 form the first switching pair, and the power MOSFETs 32 and 33 make up the second switching pair. The sources of the power MOSFETs 31 and 32 are connected to the second end of the inductor 12 for receiving the AC input voltage. The sources of the power MOSFETs 33 and 34 are connected to the supply 11 for forming a return path. The gates of the power MOSFETs 31–34 are connected to the controller 15 for receiving the switching signals $S_1$–$S_4$, respectively. The DC bulk voltage, $V_{BULK}$, is generated between the drains of the power MOSFETs 31 and 33, and 32 and 34, respectively, with a capacitor 39 coupled therebetween. The capacitor 39 filters and smooths $V_{BULK}$.

Figure 6:
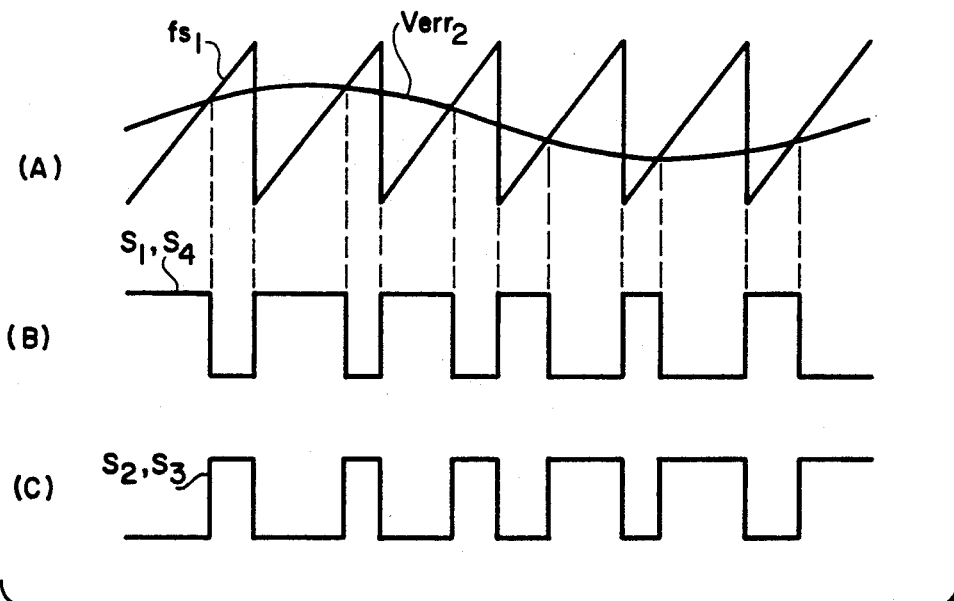
FIGS. 6a–6c are waveform diagrams of control signals used in the input current regulator, controller, and DC bulk regulator blocks of FIG. 5.

In operation, the power MOSFETs 31-34 are switched on and off in pairs. When the power MOSFETs 31 and 34 turned on ($S_1$ and $S_4$ are high), the power MOSFETs 32 and 33 are turned off ($S_2$ and $S_3$ are low), and the current $I_{12}$ ramps up or down according to the polarity of the input AC voltage. Similarly, the current $I_{12}$ ramps up or down when the MOSFETs 31 and 34 are turned off and the MOSFETs 32 and 33 are turned on. Thus, the input current, and hence $I_{12}$, may be shaped to be sinusoidal and in phase with the AC input voltage. The power MOSFETs 31-34, of course are switched under the control of the controller 15. An example of the timing of the switching signals $S_1$-$S_4$ is shown in FIGS. 6B and 6C.

Figure 5:
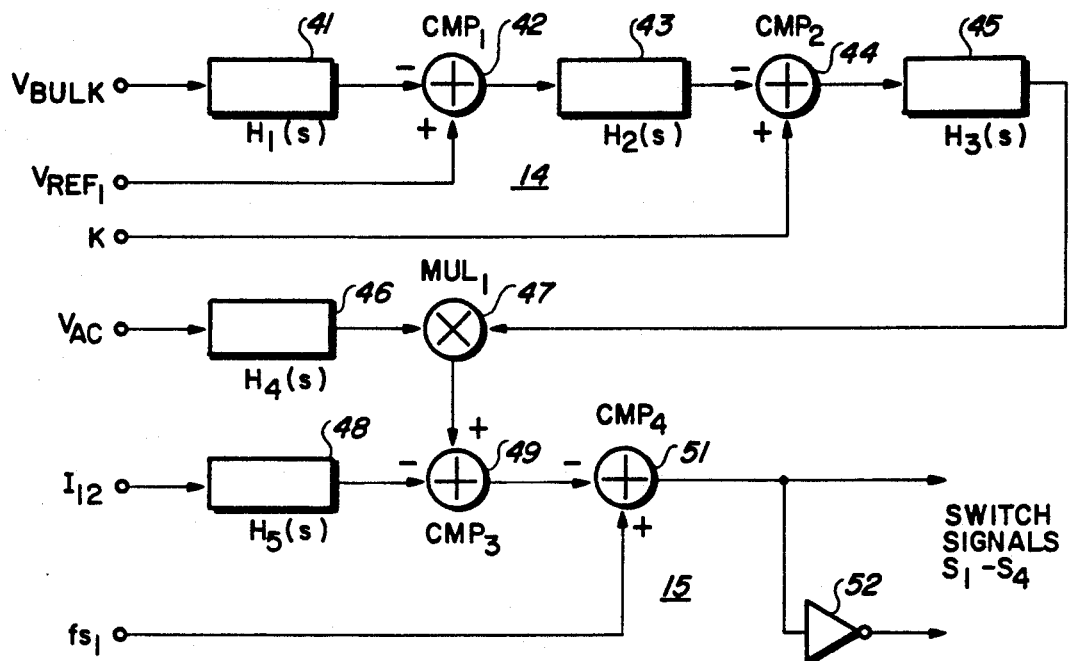
FIG. 5 is a circuit diagram of the input current regulator. controller, and DC bulk regulator blocks of the switch-mode AC-to-DC converter of FIG. 2.

FIG. 5 is a schematic diagram of the DC bulk regulator 14, the controller 15, and the input current regulator 16. The DC bulk regulator 14 includes components 41-45, the input current regulator 16 includes components 46-49 and the controller 15 includes components 51 and 52. Each component labeled $H_n(s)$ represents a scaling and/or filter stage. As described above, the controller 15 attempts to control the H-bridge 13 so as to regulate $V_{BULK}$ while causing the input current to follow the AC input voltage. Two loops are thus required, one loop for voltage regulation (DC bulk regulator 14) and another loop for current control (input current regulator 16).

In the DC bulk regulator 14, $V_{BULK}$ is applied to an input of a filter 41 for scaling and filtering. The output of the filter 41 is connected to a negative input of a comparator 42. The reference voltage, $VREF_1$, is applied to a positive input of the comparator 42. An output of the comparator 42 produces an error signal, $V_{err1}$, which is conditioned by a filter 43 before being applied to a negative input of a comparator 44. A weighting factor K, having a constant voltage magnitude, is applied to a positive input of the comparator 44 for generating an offset at an output thereof. K is necessary to program the nominal gain of a multiplier 47 which receives $V_{err1}$ as offset by K through a filter 45. Thus the multiplier gain can be limited to a predetermined range ensuring minimal distortion of the input current, or the constant K can be programmed for achieving the desired power factor.

The AC input voltage, $V_{AC}$, is applied to an input of a filter 46. $V_{AC}$ is scaled and filtered by the filter 46 such that an output of the filter 46 provides a scaled replica of the input voltage which serves as the reference current signal. The output of the filter 46 is connected to an input of the multiplier 47 wherein the reference current signal is multiplied by $V_{err1}$ as offset by K. The result at an output of the multiplier 47, is a signal equivalent to a desired input current for a regulated $V_{BULK}$ and an adjusted power factor. The inductor current, $I_{12}$, is applied to an input of a filter 48 to be scaled and filtered. An output of the filter 48 and the output of the multiplier 47 are connected to negative and positive inputs, respectively, of a comparator 49. The comparator 49 compares the desired input current to a replica of the input current for generating an error signal, $V_{err2}$, at an output thereof. $V_{err2}$ is applied to a negative input of a comparator 51 while a sawtooth waveform, $FS_1$ is applied to a positive input of the comparator 51. A pulse width modulated (PWM) $V_{err2}$ signal is available at an output of the comparator 51 which is further inverted by an inverter 52. The true and inverted signals from the comparator 51 and inverter 52, respectively, provide the switching signals $S_1$-$S_4$ for controlling the H-bridge 13. The pulse width modulated signal is shown in FIG. 6a and the switching signals $S_1$-$S_4$ are shown in FIGS. 6b and 6c.

Referring again to FIG. 2, the output of the switch-mode AC-to-DC converter 17, $V_{BULK}$, is connected to the DC-to-DC converter 21 for converting the magnitude of $V_{BULK}$ to a desired magnitude. The DC-to-DC converter 21 receives $V_{BULK}$ via a half-bridge driver 22 which functions as a chop stage. In higher power applications it may be necessary to use a full H-bridge driver as the chop stage. An output of the half-bridge driver 22 is connected to an isolation stage 23. An output of the isolation stage 23 is connected to an input of a rectifier/filter 24 for rectification and filtering of the signal and providing the desired DC bus voltage. Negative voltage feedback is used in the DC-to-DC converter 21 similar to the voltage feedback used in the switch-mode AC-to-DC converter 17. The DC bus voltage is input into a DC bus regulator 26 which also receives a constant magnitude reference voltage $VREF_2$. The compensator regulator 26 compares $VREF_2$ to the DC bus voltage and generates a bus voltage error signal therefrom. The bus voltage error signal is provided at the output of the regulator 26 which is connected to an input of a controller 25. The bus voltage error signal is pulse width modulated by the controller 25 for generating control signals which are connected to the half-bridge 22.

Figure 7:
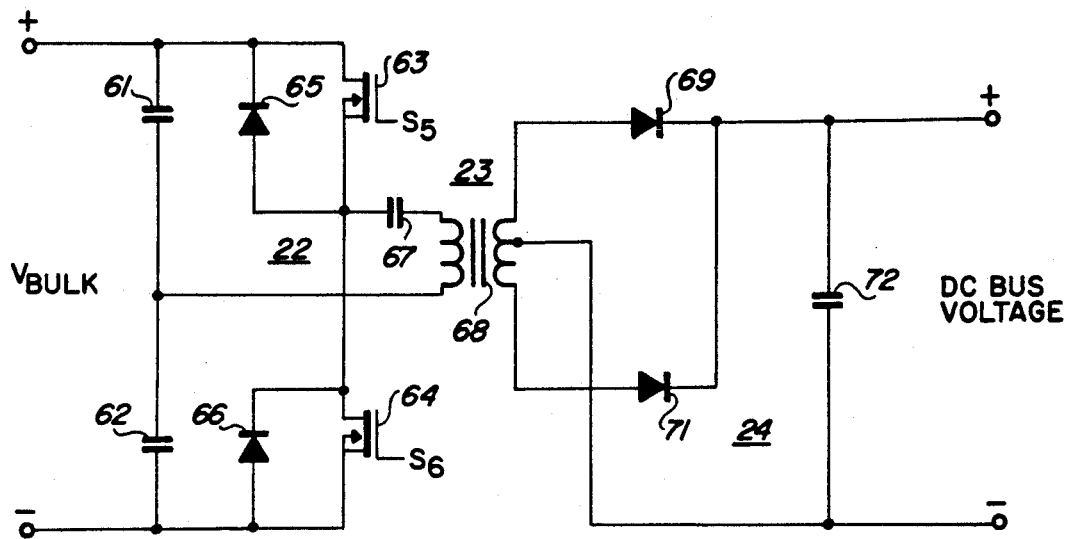
FIG. 7 is a circuit diagram of the half-bridge rectifier. isolation transformer, and filter blocks of the DC-to-DC converter portion of the switch-mode power supply of FIG. 2.

FIG. 7 schematically depicts the half-bridge driver 22, the isolation stage 23 and the rectifier/filter 24 in greater detail. The half-bridge driver 22 includes power MOSFETs 63 and 64 (with the respective parasitic body diodes 65 and 66 shown) each having a drain and source, respectively, connected for receiving $V_{BULK}$. Capacitors 61 and 62 are serially connected across $V_{BULK}$ with their series connected end coupled to a source and drain of the power MOSFETs 63 and 64, respectively, through a primary winding of a transformer 68 and a capacitor 67. The gates of the Power MOSFETs 63 and 64 are connected to the controller 25 output for receiving switching signals $S_5$ and $S_6$, respectively.

$V_{BULK}$ is chopped by the half-bridge driver 22 by alternately switching the power MOSFETs 63 and 64 on and off under the control of switching signals $S_5$ and $S_6$. A resulting squarewave is input to the transformer 68 having an average magnitude which is a function of the duty cycles of $S_5$ and $S_6$. The capacitor 67 couples the squarewave to the transformer 68 while blocking any DC voltage thereby preventing core saturation of the transformer 68. A secondary winding of the transformer 68 provides an inducted squarewave to the rectifier/filter 24 while galvanically isolating the rectifier/filter 24 from the half-bridge driver 22. Power Schottky diodes 69 and 71 have their anodes connected to the secondary winding and their cathodes connected together. A capacitor 72 is coupled between the cathodes and a center tap of the secondary winding. The inducted square waveform is rectified by the power Schottky diodes 69 and 71 and filtered by the capacitor 72. The DC bus voltage is available at the cathodes and the center tap.

Figure 8:
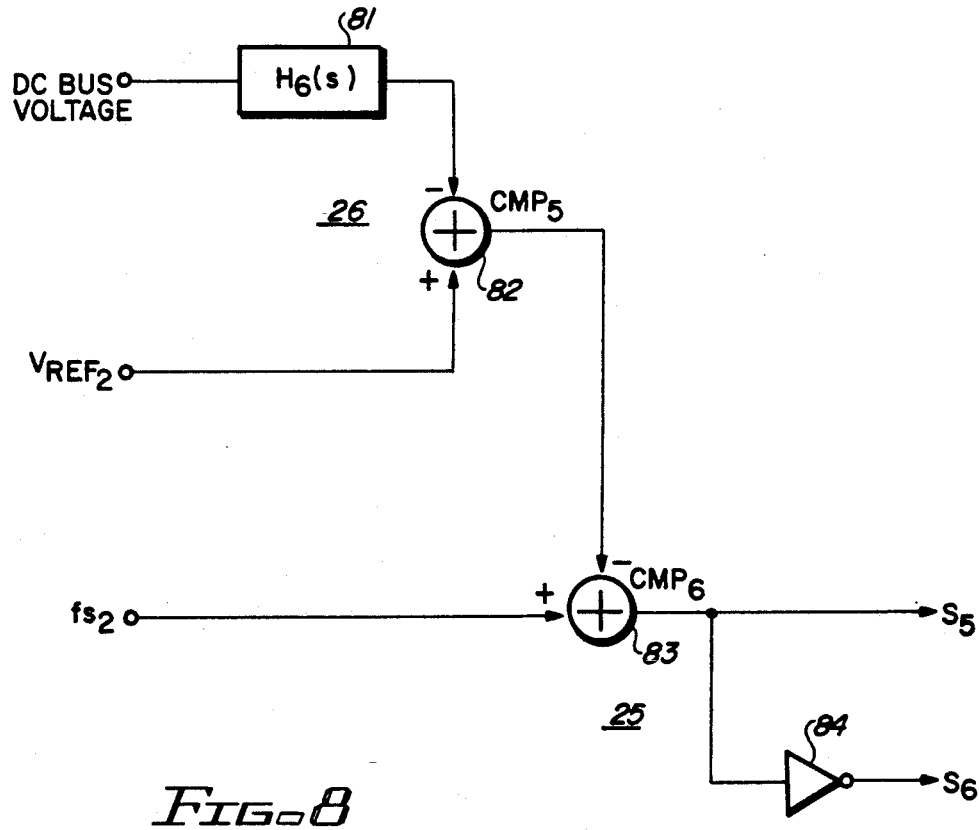
FIG. 8 is a circuit diagram of the controller and DC bus regulator blocks of the DC-to-DC converter portion of the switch-mode power supply of FIG. 2.

Referring now to FIG. 8, the controller 25 and the DC bus regulator 26 are shown in schematic form. The DC bus voltage is applied to an input of a filter 81 for filtering and scaling. An output of the filter 81 is connected to a negative input of a comparator 82. A positive input of the comparator 82 receives $VREF_2$. The comparator 82 outputs the bus voltage error signal based on a difference between the scaled DC bus voltage and VREF$_2$. The bus voltage error signal is applied to a negative input of a comparator 83 for comparison to a sawtooth waveform FS$_2$ which is applied to a positive input. A pulse width modulated error signal is thus output by the comparator 83 for providing S$_5$ which is input into an inverter 84 for further providing S$_6$. A negative feedback loop is thus provided for maintaining the DC bus voltage at a desired magnitude.

While the invention has been particularly described with reference to particular embodiments thereof, it will be understood by those skilled in the art that various other changes in detail may be made therein without departing from the spirit, scope, and teaching of the invention. With appropriate minor modifications, for example, the power MOSFETs making up the half-bridge and H-bridge drivers could be replaced by other suitable switching devices exhibiting similar characteristics. Also, the fixed frequency signals, FS$_1$ and FS$_2$ need not be limited to sawtooth waveforms.

Accordingly, the invention herein disclosed is to be limited only as specified in the following claims.

What is claimed is:

1. A switch-mode power supply having a power factor substantially equal to unity, coupled to a power source for receiving an unrectified AC input voltage and drawing an input current therefrom, the switch-mode power supply comprising:
   H-bridge driver means having a plurality of controllable switching pairs, coupled to the unrectified AC input voltage and the input current for generating a DC bulk voltage therefrom, the H-bridge driver means further coupled for receiving a first control signal for alternately switching on one pair of the plurality of switching pairs of the H-bridge driver means such that the input current is drawn to substantially follow the AC input voltage;
   first regulator means for receiving the AC input voltage and the input current, the first regulator means generating a first error signal from the unrectified AC input voltage and the input current; and
   first controller means coupled for receiving the first error signal and scaling the first error signal for providing the first control signal to alternately switch the plurality of switching pairs of the H-driver means according to the phase relationship of the input current.

2. The switch-mode power supply according to claim 1 wherein the first regulator means further comprises a scaling circuit for scaling the AC input voltage into a reference current signal, wherein the reference current signal represents a desired input current for achieving a unity power factor.

3. The switch-mode power supply according to claim 2 wherein the first regulator means further comprises a comparator. coupled for comparing the reference current signal and the input current and generating the first error signal therefrom.

4. The switch-mode power supply according to claim 1 further comprising a feedback means coupled for receiving the DC bulk voltage and a first reference voltage, the feedback means supplying a second error signal to the controller for regulating the DC bulk voltage, the first reference voltage being representative of a desired DC bulk voltage magnitude, the feedback means generating the second error signal as a function of a difference between the DC bulk voltage and the first reference voltage.

5. The switch-mode power supply according to claim 4 wherein the feedback means receives a constant. K, for offsetting the second error signal.

6. The switch-mode power supply according to claim 5 wherein the first regulator means multiplies the offset second error signal by the scaled AC input voltage for determining the reference current signal.

7. The switch-mode power supply according to claim 6 wherein the first controller means receives a fixed frequency signal for pulse width modulating the first control signal.

8. The switch-mode power supply according to claim 1 further comprises a DC-to-DC converter wherein the DC-to-DC converter comprises:
   half-bridge driver means having a plurality of controllable switching elements coupled for receiving and chopping the DC bulk voltage;
   isolation means for receiving the chopped DC bulk voltage and supplying an isolated chopped signal;
   rectification means coupled for receiving the isolated chopped signal and rectifying the isolated chopped signal into a DC bus voltage having a predetermined magnitude;
   second regulator means coupled for receiving the DC bus voltage and a second reference signal for generating a third error signal as a function of a difference between the DC bus voltage and the second reference signal; and
   second controller means coupled for receiving the third error signal and a fixed frequency signal for pulse width modulating the third error signal and generating a second control signal for switching the plurality of switching elements associated with the half-bridge driver.

9. The switch-mode power supply having a power factor substantially equal to unity, coupled to a utility source for receiving an unrectified AC input voltage and drawing an input current therefrom, the switch-mode power supply comprising:
   shaping means coupled to the utility source for shaping the input current;
   H-bridge driver means having first and second switching pairs coupled to the shaping means for receiving the AC input voltage and the input current for generating a DC bulk voltage therefrom, the H-bridge driver means further coupled for receiving a first plurality of switching signals wherein the first plurality of switching signals alternately switch the first and second switching pairs such that the input current is drawn to substantially follow the unrectified AC input voltage;
   regulator means coupled for receiving the unrectified AC input voltage and input current, the regulator means scaling the AC voltage into a reference current signal, the reference current signal representing a desired input current for achieving a unity power factor, the regulator means further comparing the reference current signal and the input current and generating a first error signal therefrom;
   feedback means coupled for receiving the DC bulk voltage and a first reference voltage and generating a second error signal therefrom for regulating the DC bulk voltage, the second error signal being further offset by a programmable constant, K; and
   first controller means coupled to the regulator and feedback means for generating the plurality of switching signals by multiplying the first error signal and the offset second error signal to control the first and second switching pairs of the H-driver means.

10. The switch-mode power supply according to claim 9 wherein the first controller means receives a fixed frequency signal for pulse width modulating the plurality of switching signals.

11. The switch-mode power supply according to claim 10 wherein the fixed frequency signal is a sawtooth waveform.

12. The switch-mode power supply according to claim 10 further comprising a DC-to-DC converter coupled for receiving the DC bulk voltage wherein the DC-to-DC converter comprises:
   half-bridge driver means having a plurality of controllable switching elements coupled for receiving and chopping the DC bulk voltage;
   isolation means for receiving the chopped DC bulk voltage and supplying an isolated chopped signal;
   rectification means coupled for receiving the isolated chopped signal and rectifying the isolated chopped signal into a DC bus voltage having a predetermined magnitude;
   compensator means coupled for receiving the DC bus voltage and a second reference signal for generating a third error signal as a function of the difference between the DC bus voltage and the second reference signal; and
   second controller means coupled for receiving the third error signal and a fixed frequency signal for pulse width modulating the third error signal for generating a switching signal for switching the plurality of switching elements associated with the half-bridge driver means.

13. A switch-mode power supply coupled to a utility source for receiving an unrectified AC input voltage and drawing an input current therefrom, using negative feedback to reduce harmonics injected into the utility source and to ensure a power factor substantially equal to unity, the switch-mode power supply comprising:
   an inductor coupled to the utility source for shaping the input current;
   an H-bridge driver having first and second switching pairs coupled to the inductor for receiving the unrectified AC input voltage and the input current for generating a DC bulk voltage therefrom, the H-bridge driver further coupled for receiving a first a first plurality of switching signals, wherein the first plurality of switching signals alternately switch the first and second switching pairs such that the input current is drawn to continually flow in the H-bridge driver;
   an input current regulator coupled for receiving the unrectified AC input voltage and the input current, the input current regulator filtering and scaling the AC input voltage into a reference current signal, the reference current signal representing a desired input current necessary for achieving a unity power factor, the input current regulator further comprising the reference current signal and the input current and generating a first error signal therefrom;
   a DC bulk regulator coupled for receiving for receiving the DC bulk voltage and first reference voltage and generating a second error signal therefrom for regulating the DC bulk voltage, the second error signal being further offset by a constant, K, to adjust the effect the second error signal has upon the H-bridge driver; and
   a controller coupled to the input current regulator and the DC bulk regulator for receiving the first and second error signals therefrom and generating the plurality of switching signals by multiplying the first error signal by the second error signal, the plurality of switching signals facilitated the control of the first and second switching pairs of the H-driver.

14. The switch-mode power supply according to claim 13 wherein the controller receives a first fixed frequency signal for pulse width modulating the plurality of switching signals.

15. The switch-mode power supply according to claim 13 wherein the first fixed frequency signal is a sawtooth waveform.

16. The switch-mode power supply according to claim 14 further comprising a capacitor coupled to an output of the H-bridge driver for filtering the DC bulk voltage.

17. The switch-mode power supply according to claim 16 further comprising a DC-to-DC converter coupled for receiving the DC bulk voltage wherein the DC-to-DC converter comprises:
   a half-bridge driver means having a plurality of controllable switching elements coupled for receiving and chopping the DC bulk voltage;
   an isolation means for receiving the chopped DC bulk voltage and supplying an isolated chopped signal;
   rectification means coupled for receiving the isolated chopped signal and rectifying the isolated chopped signal into a DC bus voltage having a predetermined magnitude;
   compensator means coupled for receiving the DC bus voltage and a second reference signal for generating a third error signal as a function of the difference between the DC bus voltage and the second reference signal; and
   second controller means coupled for receiving the third error signal and a fixed frequency signal for pulse width modulating the third error signal for generating a switching signal for switching the plurality of switching elements associated with the half-bridge driver means.

18. The switch-mode power supply according to claim 17 wherein the second fixed frequency signal is a sawtooth waveform.

* * * * *

UNITED STATES PATENT AND TRADEMARK OFFICE
CERTIFICATE OF CORRECTION

PATENT NO. :  5,233,509
DATED      :  August 3, 1993
INVENTOR(S) : Reza Ghotbi

It is certified that error appears in the above-identified patent and that said Letters Patent is hereby corrected as shown below:

At column 10, line 35, the word "The" should be --A--.

At column 12, line 1, the word "comprising" should be --comparing--.

At column 12, line 16, the word "facilitated" should be --facilitate--.

Signed and Sealed this

Twelfth Day of April, 1994

BRUCE LEHMAN

*Commissioner of Patents and Trademarks*

*Attest:*

*Attesting Officer*